United States Patent [19]

Nodov et al.

[11] 4,232,964
[45] Nov. 11, 1980

[54] DOCUMENT ILLUMINATION SYSTEM

[75] Inventors: Eugene Nodov, Richardson; Burton W. Scott, Plano, both of Tex.; George W. Denlinger, Springboro; Richard Sutera, Dayton, both of Ohio

[73] Assignee: The Mead Corporation, Dayton, Ohio

[21] Appl. No.: 75,054

[22] Filed: Sep. 12, 1979

[51] Int. Cl.³ .............................................. G03B 27/54
[52] U.S. Cl. ...................................... 355/70; 346/75; 350/6.5; 355/8; 358/293
[58] Field of Search .................. 350/6.5; 358/75, 293, 358/296; 346/75, 138; 355/8, 70

[56] References Cited

U.S. PATENT DOCUMENTS

| | | | |
|---|---|---|---|
| 4,070,089 | 1/1978 | Grafton | 355/8 X |
| 4,093,964 | 6/1978 | Aughton | 355/70 X |
| 4,142,793 | 3/1979 | Schilling | 355/8 X |

*Primary Examiner*—Richard A. Wintercorn
*Attorney, Agent, or Firm*—Biebel, French & Nauman

[57] ABSTRACT

A document illumination system adapted for use in a jet drop copier or duplicator. A pair of focussing reflectors collect illumination from two parallel line source illuminators and direct the collected illumination toward a pair of scanning mirrors. The scanning mirrors, together with a pair of side mirrors, direct narrow beams of illumination toward a common illuminated strip on the face of a document positioned on a flat document support member. The scanning mirrors are scanned in synchronism to move the illuminated strip back and forth along the face of the document, and the reflectors are concomitantly moved in synchronism to maintain an image of the illumination sources in one dimensional focus at the surface of the document. All motion of the scanning mirrors and the reflectors is produced by a single drive motor, which drives a set of interspersed timing belts to produce uniform rotary motion of the input shafts for four conjugate cam arrangements. The conjugate cam arrangements are appropriately configured for producing the requisite motion of the reflectors and the scanning mirrors.

19 Claims, 14 Drawing Figures

DOCUMENT ILLUMINATION SYSTEM

CROSS-REFERENCE TO RELATED APPLICATIONS

This application is related to Appln. Ser. No. 75,063, filed Sept. 12, 1979 entitled Jet Drop Copying System, Appln. Ser. No. 75,053, filed Sept. 12, 1979 entitled Line Source Illuminator, and Appln. Ser. No. 75,297 filed Sept. 12, 1979 entitled Document Illumination Apparatus, all filed on even date herewith and all assigned to the assignee hereof.

BACKGROUND OF THE INVENTION

This invention relates to illumination systems for jet drop copiers and duplicators of the type disclosed and claimed in copending application Ser. No. 75,063, filed Sept. 12, 1979.

Prior art illumination systems for jet drop copying have used fixed sources of illumination, as generally disclosed in Paranjpe et al U.S. Pat. No. 4,112,469. Such prior art illumination systems flood the original document with a constant field of uniform light. This wastes energy, because only relatively small portions of the document are being viewed at any one time by the image scanning system. Moreover, the prior art system is unable to provide illumination at sufficiently high levels for document scanning at the speeds contemplated by Ser. No. 75,063.

Another prior art illumination arrangement for ink jet copying is disclosed in Taylor U.S. Pat. No. 3,564,120, wherein a series of sensing heads each contain a light source and a photosensing element. The light sources create small spots of illumination, which are swept across the document by the scanning heads.

Other illumination arrangements within the general field of flat plane document scanning are disclosed in Herriott U.S. Pat. No. 2,262,584 and Lloyd U.S. Pat. No. 3,752,558. Herriott discloses means for scanning a beam of light, while Lloyd discloses a moving carriage upon which are mounted a series of illuminating lamps. Another prior art arrangement, as disclosed in Libby U.S. Pat. No. 3,694,070, utilizes a pair of rotating reflectors for synchronous scanning of elongated light beams across the surface of a document positioned on a curved document plane.

SUMMARY OF THE INVENTION

The illunination system of this invention provides an illumination station comprising two line sources of illumination positioned perpendicularly between a pair of side mirrors. Light from these illumination sources is collected and focussed by a pair of focussing reflectors, so as to create intense elongated beams of illumination. These beams of illumination are directed toward a common strip extending across a document positioned on a flat document supporting member. A pair of scanning mirrors scan the beams in synchronism across the document while the focussing reflectors are concomitantly repositioned to maintain images of the illumination sources in one dimensional focus at the document plane. A common drive motor utilizes timing belts to drive cam mechanisms which rotate the scanning mirrors and reposition the focussing reflectors.

DESCRIPTION OF THE PREFERRED EMBODIMENT

Figure 1:
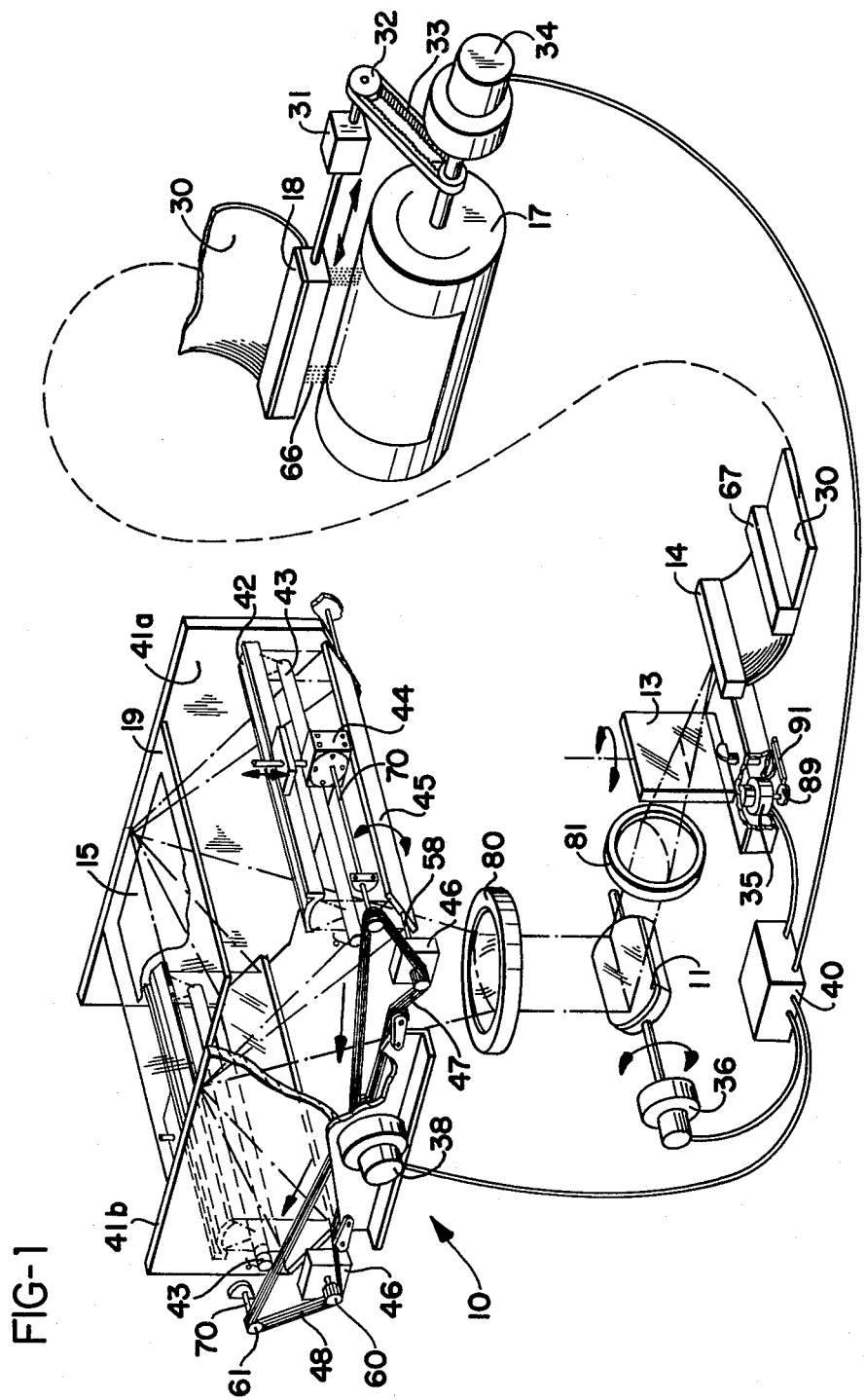
FIG. 1 is a pictorial drawing of a jet drop copying or duplicating system.

The preferred embodiment of this invention is particularly adopted for use in a jet drop coying or duplicating system, as generally illustrated in FIG. 1. The overall system generally comprises an illumination station 10, a scanning mirror 11, a collimating lens 80, an imaging lens 81, an image shifting plate 13, a photodetector array 14, and ink jet print head 18, and a drum 17 for supporting a print sheet 16.

Illumination station 10 includes a flat plate 19 for supporting an original document 15. The document 15 is scanned by two synchronously driven narrow beams of light, as hereinafter described, to create a narrow illuminated strip extending across one dimension of the document. The document portion which is so illuminated is imaged upon the face of photodetector array 14. Photodetector array 14 supplies scanning signals to a printing controller 67, which is connected via a set of electrical cables 30 to ink jet print head 18.

Printing controller 67 comprises a series of amplifiers which generate binary printing control signals as generally taught in Taylor et al U.S. Pat. No. RE 28,219. Print head 18 produces a series of printing streams 66 which are controlled by the binary printing control signals to produce a representation of the scanned area of document 15 upon the surface of print sheet 16. Printing streams 66 comprise uniformly sized and regularly spaced drops, as taught in Taylor et al, and the streams are positioned in correspondence with the positioning of the photodiodes comprising the array 14. The drop streams are selectively charged, deflected and caught under control of the binary printing control signals, so that the printed pattern on print sheet 16 comprises a series of uncharged and undeflected drops.

It is contemplated that the jets comprising the jet array be quite close together, but not so close together as to provide side-by-side overlapping print traces. A cam arrangement 31 oscillates print head 18 from side-by-side, thereby achieving the overlapping which is required for solid printing coverage. Cam arrangement 31 is driven by drive motor 34, timing belt 33 and timing gear 32. Drive motor 34 also drives printing drum 17, as illustrated in FIG. 1. The system is designed to print from right-to-left and from left-to-right, so that flyback of print head 18 is not required.

Image scanning is carried out by an imaging system comprising collimating lens 80, image scanning mirror 11, imaging lens 81, and image shifting plate 13. A servomotor 36 rotates scanning mirror 11 forwardly in synchronism with the rotary motion of printing drum 17, and this forward scanning motion is followed by a high speed flyback during the period of time when the non printing side of printing drum 17 is being presented to the printing jets 66. A stepping motor 35 rotates a cam 89 for moving a cam follower 91 to rotate the plate 13. Image shifting plate 13 comprises a refractive glass plate for lateral image shifting in angular steps, as described in Ser. No. 75,063. Lateral image shifting proceeds in synchronism with the oscillating movement of print head 18. Drive motor 34, servomotor 36 and stepping motor 35 all operate under common control of a control unit 40.

Figure 2:
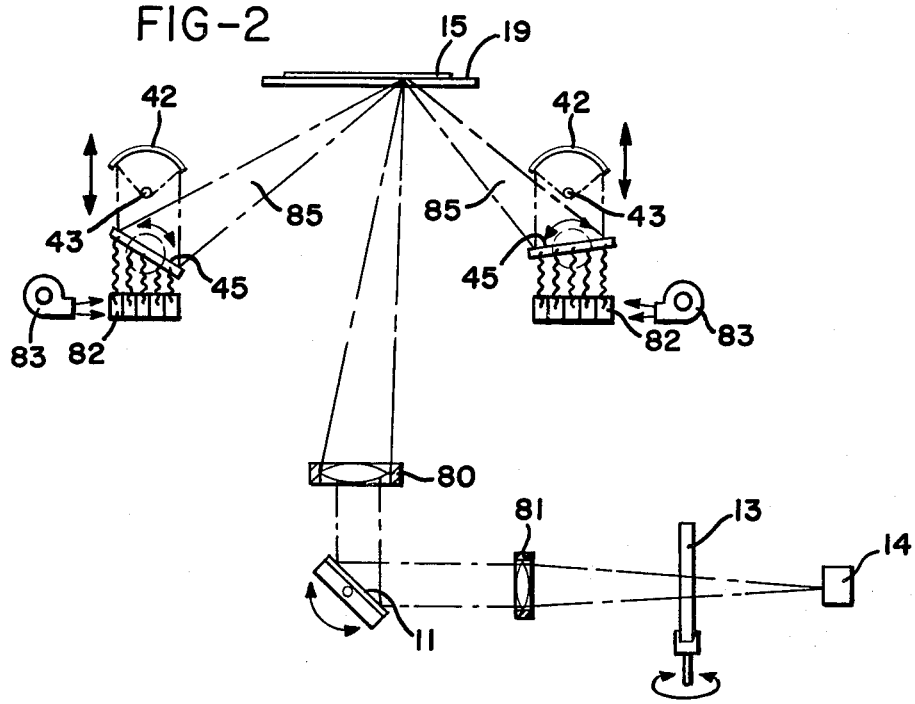
FIG. 2 is a schematic illustration of document illumination and imaging as seen in side elevation.
Figure 3:
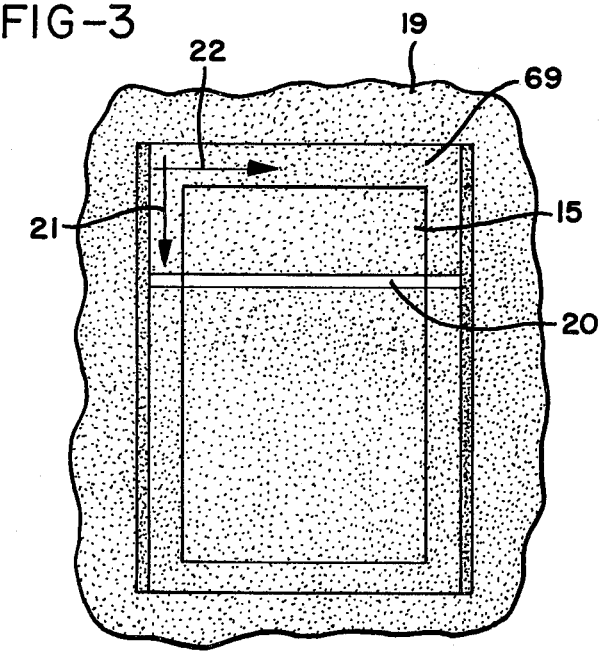
FIG. 3 is a schematic illustration of illumination of a document plane.

FIG. 2 presents a schematic illustration of image scanning by the above described apparatus. Also presented in FIG. 2 is a schematic illustration of document illumination by apparatus configured in accordance with the preferred embodiment of this invention. The schematic illustration of document illumination is supplemented by the further schematic illustration of FIG. 3, wherein the document 15 is illustrated as being positioned upon a supporting glass plate 69 within the support surface 19. Document 15 is shown as being illuminated by an elongated beam of light to create a narrow illuminated strip 20 extending laterally across the document in a first direction parallel to the directional arrow 22. The beam of illuminating light is scanned longitudinally across document 15 in a second direction as indicated by the arrow 21.

Apparatus for creating and scanning the illuminated strip 20 includes a pair of line source illuminators 43, 43, a pair of focussing reflectors 42, 42, and a pair of scanning mirrors 45, 45. The illuminators 43, 43, extend transversly across illuminating station 10 as best illustrated in FIG. 1. Light which is generated by the illuminators is focussed by focussing reflectors 42, 42, into a pair of converging light beams 85, 85. These light beams are directed toward mirrors 45, 45, which have a dichroic coating for selectively transmitting infrared energy toward heat sinks 82, 82. A pair of fans 83, 83, blow cooling air over heat sinks 82, 82.

The dichroic coating on mirrors 45, 45, preferably comprises alternating layers of silicon dioxide and titanium dioxide. The coating may have a peak transmission wavelength of 9000 Angstroms and is highly reflective to energy in the visible spectrum. Thus the beams 85, 85, are converted into beams of primarily visible light, which are directed convergingly toward document 15 by the mirrors 45, 45. The convergence of beams 85, 85, at the surface of document 15 defines illuminated strip 20. Scanning of beams 85, 85, is accomplished by synchronous rotary oscillation of mirrors 45, 45, under control of a pair of first cam mechanisms 46, 46. Cam mechanisms 46, 46, also provide a high speed flyback for mirrors 45, 45.

Illuminated strip 20 comprises superimposed one-dimensional images of the electrical filaments within illumination lamps 43, 43. In order to maintain one-dimensional focus of the filaments, reflectors 42, 42, are given a vertically repositioning motion by a pair of second cam mechanisms 44, 44. Cam mechanisms 44, 44, 46, and 46, are commonly driven by drive motor 38 and timing belt arrangements 47 and 48, so that movement of reflectors 42, 42, proceeds in synchronism with the scanning oscillation of mirrors 45, 45. This maintains the illuminated strip 20 at the proper position for both of reflectors 42, 42, and produces a very narrow and intense strip of illumination.

Preferably reflectors 42, 42, are of generally trough-shaped configuration with a crosssection defining an ellipse sector. This configuration produces the above mentioned one-dimensional image of the illumination filaments, which is sharply defined in the longitudinal direction and completely out of focus in the lateral direction. Thus there is no observable representation of the actual structure of the electrical filaments.

In a typical application the document plane may extend about 7 inches on each side of the plane of symmetry of illumination station 10. For such an arrangement the illumination lamps may be positioned about 7 inches below the document plane and have a horizontal separation of about 27.5 inches. Reflectors 42 may have a nominal position which is about 4.9 in. above their illumination lamps 43, and the vertical movement of reflectors 42 may be in the order of about ±0.1 inch. For producing the beams 85, reflectors 42 may be configured as sectors of an ellipse having a semi major axis of 15.1 inches and a semi minor axis of 11.1 inches; the illumination lamps 43 being positioned near the primary focus lines of such elliptical troughs. Such an arrangement has been found to be effective for maintaining filament focus and also for minimizing variations in the intensity of the illumination radiated upon the document plane.

It can be seen that as the beams 85, 85, scan across the document plane, they alternately strike points which are more distant and less distant from the line source illuminators. When the one beam is at its maximum length, then the other beam is at its minimum. During the course of one complete scan, the path length extending from either of reflectors 42 down to the corresponding mirror 45 and thence to the face of document 15 varies from about 22 inches to about 32 inches. In accordance with physical laws governing the propogation of radiation from long trough systems the intensity of the illumination received by the strip 20 from one of the reflectors 42 is inversely proportional to the overall path length of the corresponding beam 85. Thus as one of the beams 85 lengthens, its illumination contribution to the strip 20 decreases. However, the other beam 85 is simultaneously growing shorter, so that its illumination contribution to the strip 20 increases. The cooperative scanning action of the two beams 85 therefore produces a balance of illumination throughout the scan.

It will be appreciated that the required one-dimensional images of the lamp filaments may be created by anamorphic optical means other than trough type reflectors. A similar effect may be achieved, for instance by an alternative embodiment comprising a cylinder lens. Such a lens may be scanningly rotated in a manner similar to the rotation of mirrors 45, 45, and the axis of rotation may be translated to maintain a conjugate focal relationship throughout the scan.

Figure 11:
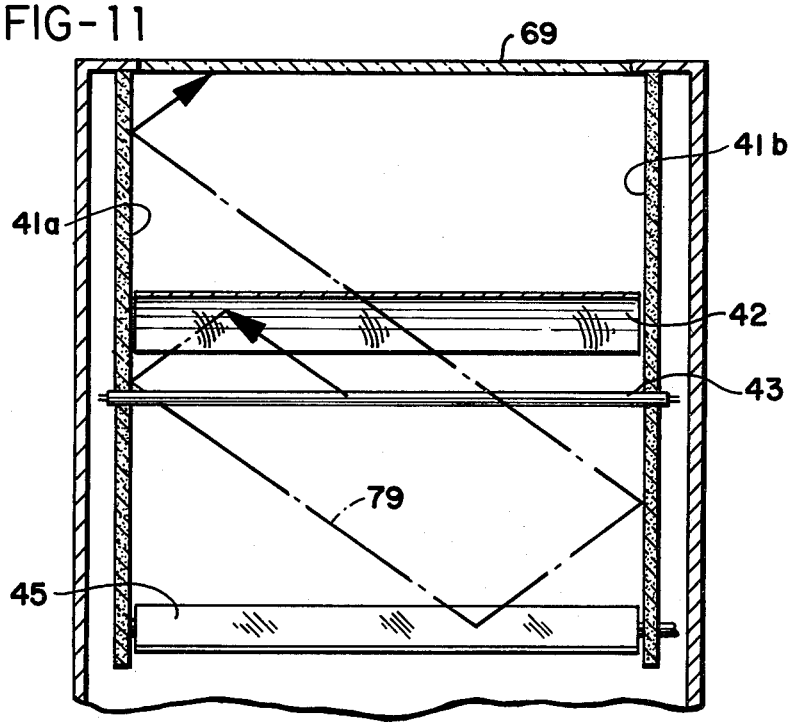
FIG. 11 is a cross sectioned front elevation view of an illumination station.
Figure 12:
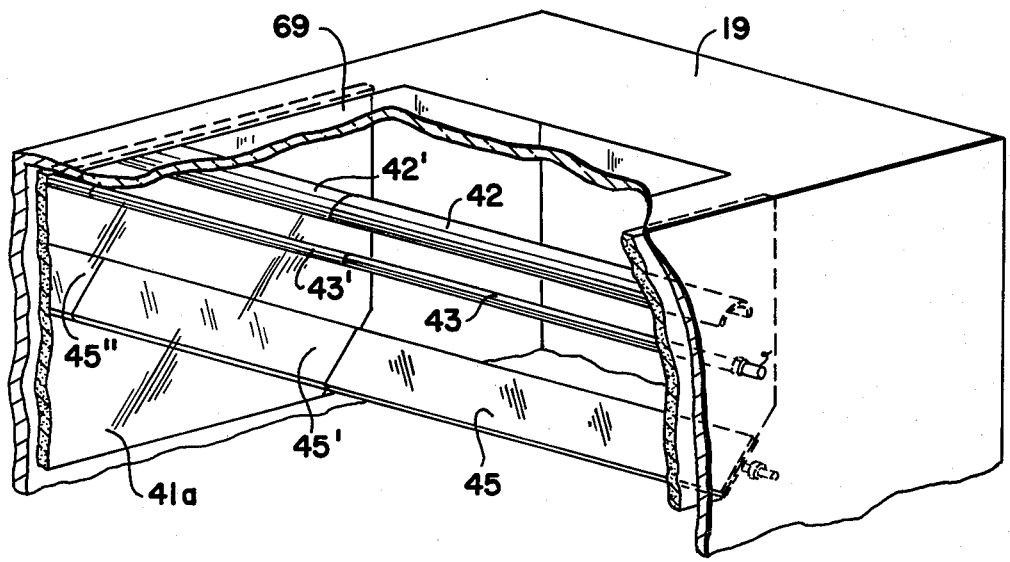
FIG. 12 is a partially cut away pictorial illustration of an illumination station.

The creation of the intense, superimposed one dimensional images of the electrical filaments of lamps 43, 43, is substantially enhanced by reflective side surfaces 41a and 41b, as generally illustrated in FIGS. 11 and 12.

Reflective surfaces 41a and 41b intercept sidewardly directed light and redirect it inwardly toward the illuminated strip 20. This is best understood by referring to FIG. 11 and noting the path of a representative light ray 79. The ray leaves its illumination lamp 43 along a generally upward and sideward path. The ray first reaches the trough reflector 42 and then follows a downward and sideward path toward the left side mirror 41a. Mirror 41a reflects the ray inwardly, and downwardly toward scanning mirror 45. Scanning mirror 45 then directs the ray upwardly toward glass plate 69. During its upward travel toward glass plate 69, the ray is reflected inwardly once by right side mirror 41b and once again by left side mirror 41a.

The net result of the light redirection by the side mirrors 41a and 41b is the creation of an illumination source of effectively infinite length. This is illustrated in FIG. 12, which illustrates the illumination station as it actually appears on visual inspection. Each of the side mirrors 41a and 41b present a series of images extending toward infinity. Thus FIG. 12 illustrates a first image 42' of focussing reflector 42, a first image 43' of illumination lamp 43 and first and second images 45' and 45" of scanning mirror 45. Side mirrors 41a and 41b increase the illumination level at the document plane by a factor of about 3.2 in a typical embodiment as herein described. When such an embodiment uses a pair of illumination lamps 43, 43, having tungsten filaments and ratings of 1000 watts each, then an illumination level of about 1 watt per $cm^2$ is achieved at te illuminated strip 20.

Motor 38 is controlled by control unit 40, so that the scanning of document 15 by the light beams 85, 85, proceeds in synchronism with the rotary oscillation of image scanning mirror 11. Thus photodetector array 14 senses the various areas of document 15 concomitantly with the illumination of those areas by light beams 85, 85.

Figure 4:
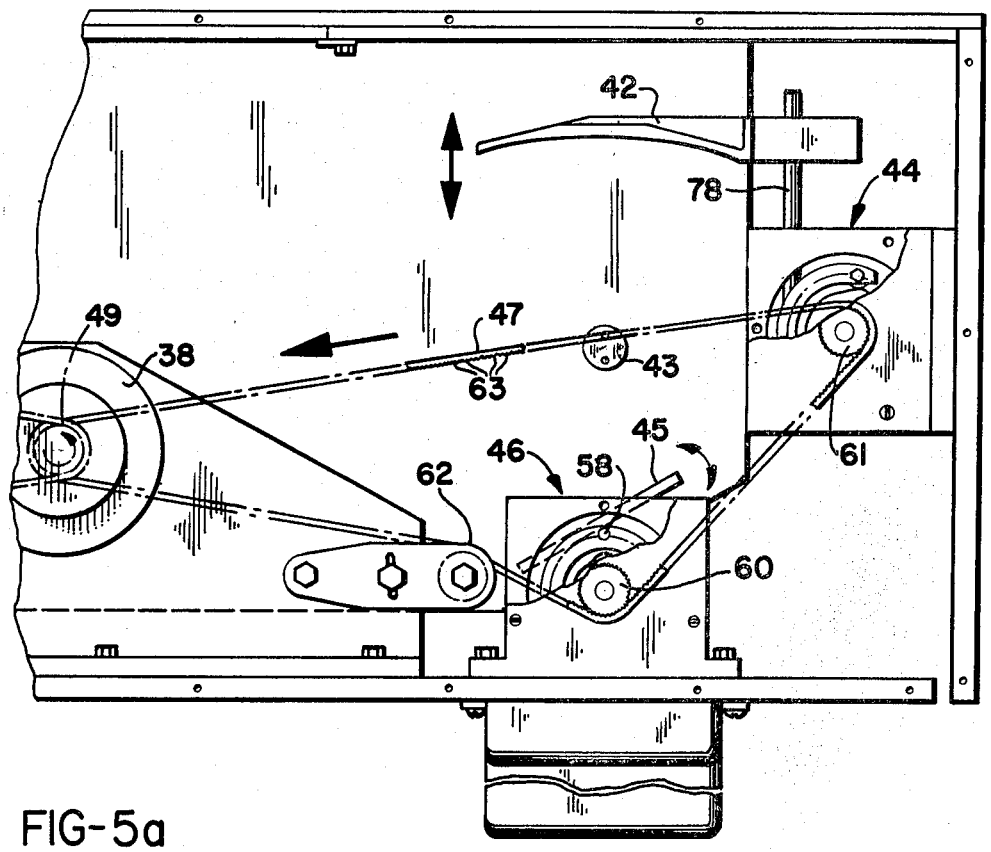
FIG. 4 is a partially cut away side elevation view of a portion of an illumination station.
Figure 7:
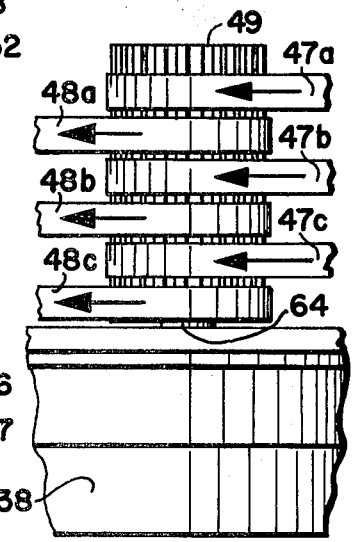
FIG. 7 is an illustration of timing belt placement on a drive gear.

The driving arrangement for one reflector 42 and one illumination mirror 45 is illustrated schematically in FIG. 4. The illustration relates to the right hand side of the illumination station, wherein the driving force is transmitted by timing belt arrangement 47. The reflector 42 and illumination scanning mirror 45 comprising the left hand side of illumination station 10 are driven in a similar manner by timing belt arrangement 48. As best illustrated in FIG. 7, timing belt arrangement 47 comprises three timing belt segments 47a through 47c, and timing belt arrangement 48 comprises three timing belt segments 48a through 48c. The two timing belt arrangements are positioned on a common drive gear 49 with their segments interspersed. Gear 49 is attached to drive shaft 64 of drive motor 38 for constant speed driving in one rotational direction, as illustrated.

All segments of timing belt arrangements 47 and 48 comprise a series of teeth 63 for engagement with driving gear 49 and a pair of driven gears 60 and 61. The three belt segments comprising one timing gear arrangement are preferably produced by longitudinal tri-section of a single timing belt. The three belt segments so obtained are relatively shifted, so that the three segments of one original tooth 63 move along the drive path at separated positions. This tends to reduce drive belt errors, as taught in Cahill et al U.S. Pat. No. 3,730,011.

Figure 8:
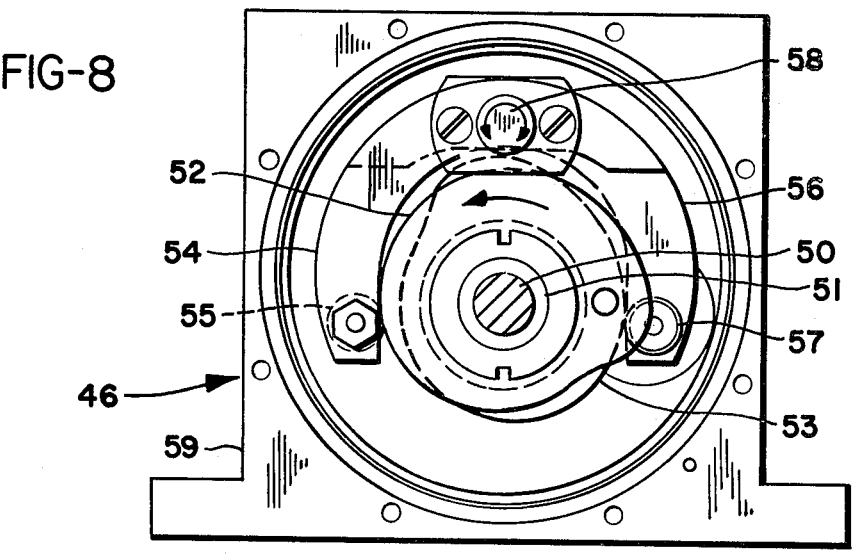
FIG. 8 is a side elevation view of a cam arrangement for rotating an illumination scanning mirror.
Figure 9:
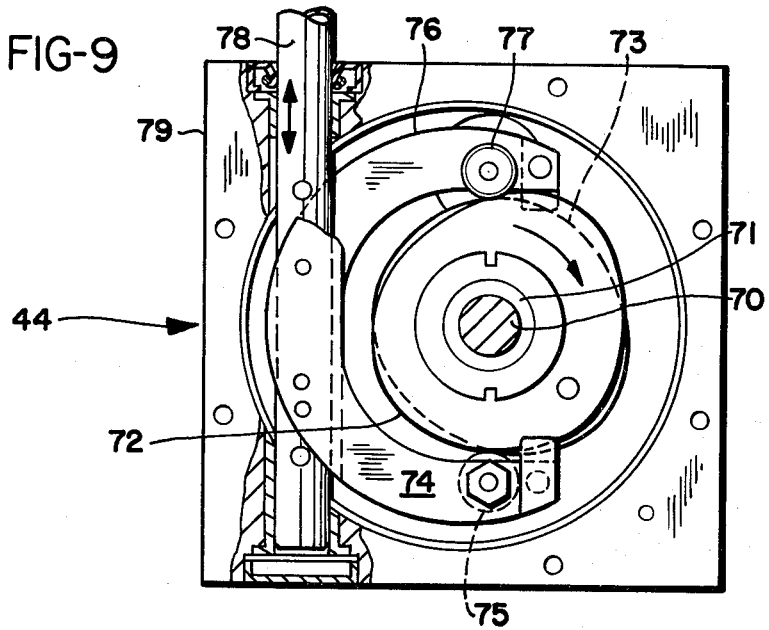
FIG. 9 is a side elevation view of a cam arrangement for repositioning a focussing reflector.
Figure 10:
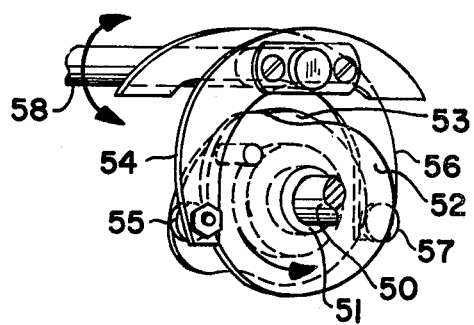
FIG. 10 is a perspective drawing of the cam arrangement of FIG. 8.

As illustrated in FIG. 4, focussing reflector 42 is oscillated for vertical repositioning by an output shaft 78 from cam mechanism 44. Rotary oscillation of illumination scanning mirror 45 is produced by an output shaft 58 from cam mechanism 46. Cam mechanism 44 and 46 are driven by drive gears 61 and 60 respectively, and appropriate tension for the timing belt arrangement is provided by an idling roller 62. Cam mechanism 46 includes a conjugate cam arrangement, which is configured as generally illustrated in FIGS. 8 and 10 and which operates as illustrated schematically in FIGS. 6a and 6b. Cam mechanism 44 includes aother conjugate cam arrangement, which is configured as illustrated in FIG. 9 and which operates as illustrated schematically in FIGS. 5a and 5b.

Cam mechanism 46 comprises an input shaft 50, a cam hub 51 which is fast on cam shaft 50, and first and second cams 52 and 53 respectively, both of which are mounted fast on cam hub 51. There is a first follower arm 54, which is mounted fast on output shaft 58 and which supports a first following roller 55 against first cam 52. Likewise there is a second follower arm 56, which is mounted fast on output shaft 58 and which supports a second following roller 57 against second cam 53. Output shaft 58 is supported in a bearing means (not illustrated) and is rigidly connected to mirror 45.

Figure 6A:
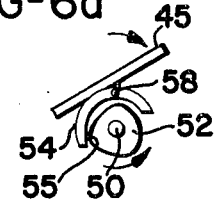
FIGS. 6a and 6b are schematic illustrations of rotation of an illumination scanning mirror.

As illustrated in FIG. 6a, counter clockwise rotation of input shaft 50 produces a corresponding counter clockwise rotation of the first cam 52. The counter clockwise rotation of cam 52 pushes roller 55 outwardly to cause a slight clockwise rotation of follower arm 54 and mirror 45. This clockwise motion continues only for some relatively short stroke as required for system operation and as established by the contour of cam 52.

Figure 6B:
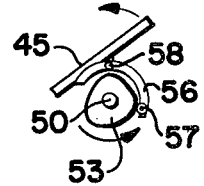

When follower arm 54 reaches the end of its clockwise stroke, second cam 53 engages roller 57 and causes second follower arm 56 to rotate in a short counter clockwise stroke as illustrated in FIG. 6b. This returns the mirror 45 to its initial position. The two cams 52 and 53 continually rotate in the counter clockwise direction as viewed in FIGS. 6a and 6b and cause continued alternating clockwise and counter clockwise rocking of follower arms 54 and 56.

It has been found that full overlapping of the two beams is not necessary for uniform illumination of the far top and bottom portions of the document. The system takes advantage of this fact in order to ease the mechanical requirements associated with flyback of the mirrors 45, 45. Thus, as the two beams near the bottom of the document, the longer beam is started backward toward the top of the document (now becoming a short beam). Shortly thereafter the other beam reaches the end of the document and is driven backward to a point where it can rejoin the first beam.

Figure 5A:
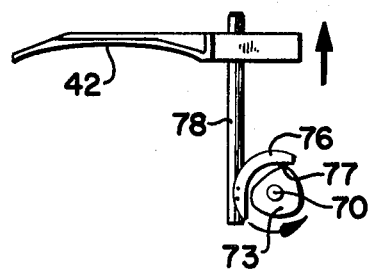
FIGS. 5a and 5b are schematic illustrations of repositioning of a focussing reflector.
Figure 5B:
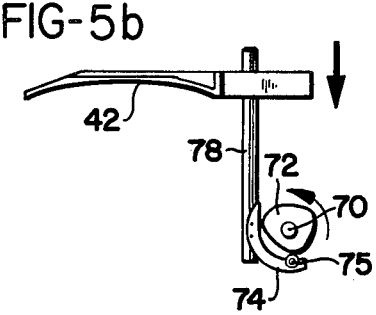

Cam mechanism 44 has a cam hub 71 mounted fast on input shaft 70 in like manner as the mounting of cam hub 51 on its input shaft 50. A first cam 72 and a second cam 73 are mounted fast on hub 71 for rotation in the counter clockwise direction as viewed in FIGS. 5a and 5b. During a portion of each rotation of shaft 70, cam 72 bears downwardly against a first roller 75 connected to a first follower arm 74. First follower arm 74 is mounted fast on output shaft 78, so that downward movement of the roller 75 and follower arm 74 produces downward motion of reflector 42, as shown in FIG. 5b.

After reflector 42 reaches the bottom of its downward stroke, second cam 73 engages a second roller 77 mounted on second follower arm 76. Second follower arm 76 is also mounted fast on output shaft 78, so that cam 73 produces upward motion of reflector 42, as illustrated in FIG. 5a. Downward and upward motion of reflector 42 proceeds in synchronism with the rocking motion of mirror 45 so as to maintain the above described illumination condition at the face of document 15.

While the form of apparatus herein described constitutes a preferred embodiment of the invention, it is to be understood that the invention is not limited to this precise form of apparatus, and that changes may be made therein without department from the scope of the invention.

What is claimed is:

1. A document illumination system comprising a flat document support member including a transparent window, a pair of parallel line source illuminators positioned below said window at opposite ends thereof, a pair of focussing reflectors positioned for collecting illumination from said illuminators and configured for focussing said illumination into a pair of narrow beams each having a linear extent substantially equal to the full width of a document to be copied, a pair of scanning mirrors positioned in the paths of said beams and arranged for directing said beams toward a common strip extending laterally across said document, a pair of first cam mechanisms for cooperatively rotating said scanning mirrors to cause scanning of said beams longitudinally along the length of said document, a pair of second cam mechanisms for repositioning said focussing reflectors and adjusting the focussing action thereof in synchronism with the scanning of said beams, a common drive motor, and drive means connecting said drive motor to all of said cam mechanisms for common driving thereof.

2. Apparatus according to claim 1 wherein said drive means comprise timing belts and a common drive gear driving all of said timing belts.

3. Apparatus according to claim 2 wherein said drive means comprise first timing belt means connecting said drive gear to the first and second cam mechanisms controlling one of said light beams and second timing belt means connecting said drive gear to the first and second cam mechanisms controlling the other of said light beams.

4. Apparatus according to claim 3 wherein said first and second timing belt means each comprise a plurality of belt segments and wherein said timing belt means are positioned on said drive gear with their segments interspersed.

5. Apparatus according to any of claims 1 through 4 wherein said cam mechanisms each comprise an input shaft connected for continuous steady speed rotation by said drive means, first and second cams secured to said input shaft, and first and second cam followers supported in conjugate relationship respectively against said first and second cams for providing oscillating mechanical outputs in response to said continuous steady speed input.

6. Apparatus according to claim 5 and further comprising a pair of reflective side surface which are positioned perpendicular to said line source illuminators for intercepting sidewardly directed light and redirecting said light inwardly toward said strip.

7. Document illumination apparatus comprising a document support member for supporting a document in a flat scanning plane, a pair of parallel illumination line sources positioned in a plane parallel to said flat scanning plane and at opposite ends of the area of document support, anamorphic optical means for receiving illumination from said line sources and directing substantially one-dimensional images thereof toward superimposed positions on said scanning plane, scanning means for scanning said superimposed images across said scanning plane and refocussing means for adjusting the foci of said images during said scanning.

8. Apparatus according to claim 7 wherein said anamorphic optical means comprise a pair of trough type focussing reflectors facing said illumination line sources and extending parallel therewith.

9. Apparatus according to claim 8 wherein said scanning means comprise a pair of scanning mirrors positioned for facing said focussing reflectors and said scanning plane, and means for rotating said scanning mirrors about axes parallel with said illumination line sources.

10. Apparatus according to claim 9 wherein said refocussing means comprise means interconnected with said scanning means for reciprocating said focussing reflectors toward and away from said scanning mirrors.

11. Apparatus according to claim 10 wherein said focussing reflectors having crossections defining ellipse sectors.

12. Apparatus according to any of claims 7 through 11 and further comprising a pair of reflective side surfaces which are positioned perpendicular to said illumination line sources for intercepting sidewardly directed light rays and redirecting them inwardly toward said scanning plane.

13. Apparatus according to claim 11 wherein said scanning means further comprise a pair of first cam mechanisms for rotating said scanning mirrors, a common drive motor including a drive shaft and a timing belt arrangement connecting said drive shaft to said first cam mechamisms.

14. Apparatus according to claim 13 wherein said refocussing means comprise a pair of second cam mechanisms driven by said timing belt arrangement and means connecting said second cam mechanisms to said focussing reflectors.

15. Apparatus according to claim 14 wherein said cam mechanisms each comprise an input shaft connected for continuous steady speed rotation by said timing belt arrangement, first and second cams secured to said input shafts and first and second cam followers supported in conjugate relationship respectively against said first and second cams for providing oscillating mechanical outputs in response to said continuous steady speed input.

16. Apparatus according to claim 15 wherein said timing belt arrangement comprises a drive gear connected to said drive shaft, first timing belt means connecting said drive gear to one interconnected set of first and second cam mechanisms, and second timing belt means connecting said drive gear to the other interconnected set of first and second cam mechanisms.

17. Apparatus according to claim 16 wherein said first and second timing belt means each comprise a plurality of belt segments and wherein said first and second timing belt means are positioned on said drive gear with their segments interspersed.

18. Apparatus according to claim 17 and further comprising a pair of reflective side surfaces which are positioned perpendicular to said illumination line sources for intercepting said sidewardly directed light rays and directing them inwardly toward said scanning plane.

19. Apparatus according to claim 18 wherein said focussing reflectors have crossections defining ellipse sectors.

* * * * *